(12) United States Patent
Sigler et al.

(10) Patent No.: US 11,756,107 B1
(45) Date of Patent: Sep. 12, 2023

(54) DYNAMIC CONTEXTUAL NAVIGATION

(71) Applicant: Amazon Technologies, Inc., Seattle, WA (US)

(72) Inventors: David Sigler, Tustin, CA (US); Feroz Abdul Kadar, Irvine, CA (US); Xiaoqi Shi, Irvine, CA (US); Wesley Lauka, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 379 days.

(21) Appl. No.: 16/819,551

(22) Filed: Mar. 16, 2020

(51) Int. Cl.
*G06Q 30/00* (2023.01)
*G06Q 30/0601* (2023.01)

(52) U.S. Cl.
CPC ....... *G06Q 30/0643* (2013.01); *G06Q 30/0603* (2013.01); *G06Q 30/0631* (2013.01)

(58) Field of Classification Search
CPC .............. G06Q 30/0643; G06Q 30/0603; G06Q 30/0631
USPC ................................................ 705/26.1-27.2
See application file for complete search history.

(56) References Cited

U.S. PATENT DOCUMENTS

2007/0143264 A1* 6/2007 Szeto ................. G06F 16/3323
2008/0282199 A1* 11/2008 Gherardi ............. G06F 16/954
715/854

OTHER PUBLICATIONS

M. L. Huang, Q. V. Nguyen, V. C. Vo and J. Wang, "A Zoomable Shopping Browser Using a Graphic-Treemap," 2009 Sixth International Conference on Computer Graphics, Imaging and Visualization, Tianjin, China, 2009, pp. 449-453, doi: 10.1109/CGIV.2009.13. (Year: 2009).*

* cited by examiner

*Primary Examiner* — Anand Loharikar
(74) *Attorney, Agent, or Firm* — Thomas | Horstemeyer, LLP (57) ABSTRACT

Disclosed are various embodiments for providing a unique navigation experience for a user interacting with an electronic commerce site by dynamically generating a navigation interface according to a user context for a given shopping experience. The user context associated with a user interacting with an electronic commerce site can be determined following an analysis of a variety of context factors. A navigation interface can be dynamically generated based on the user context. In some examples, navigation components within the navigation interface can be associated with different categories that the user can navigate through. The navigation components can visually indicate a level of completeness for a given category so that the user is aware of where he or she is in a given shopping experience.

20 Claims, 9 Drawing Sheets

DYNAMIC CONTEXTUAL NAVIGATION

BACKGROUND

An electronic commerce system may include listings of items (e.g., products, goods, services, digital content, etc.) offered for sale, lease, download, rent, etc., by many different merchants. Users may use the electronic commerce system to purchase, lease, download, rent, etc., items of interest. In some instances, as a user navigates through different network pages of the electronic commerce system, the user may miss certain items of interest by failing to visit network pages associated with those items or the user may end up navigating to dead-ends without realizing that he or she missed other network pages of interest.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing a unique navigation experience for a user interacting with an electronic commerce site by dynamically generating a navigation interface according to a user context for a given shopping experience. In particular, the navigation interface comprises navigation components that are generated to not only redirect the client device to different pages within the electronic commerce site, but to also inform the user, via a visualization, of areas (e.g., pages, content, etc.) within the electronic commerce site that the user may have already viewed or areas that the user has not yet viewed. The user context can be used in order to present navigation components to the user that ensures that (1) the user is aware of where he or she is in a given shopping experience and (2) the user avoids a dead end during his or her shopping experience.

The user context can be based on a variety of factors including, for example, store brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during an active shopping experience (e.g., searching behavior, browsing behavior, and add to cart behavior), aggregate user interaction behavior (e.g., interaction behavior of multiple user accounts), item availability (e.g., inventory, delivery capacity), event notice (e.g., emergency, road closure, etc.), time (e.g., date, year, week, day), seasonality, and/or other factors. According to various embodiments, an analysis of these factors can be used to determine a user context that can be used to define a navigation experience for a user during a given shopping experience.

Figure 1:
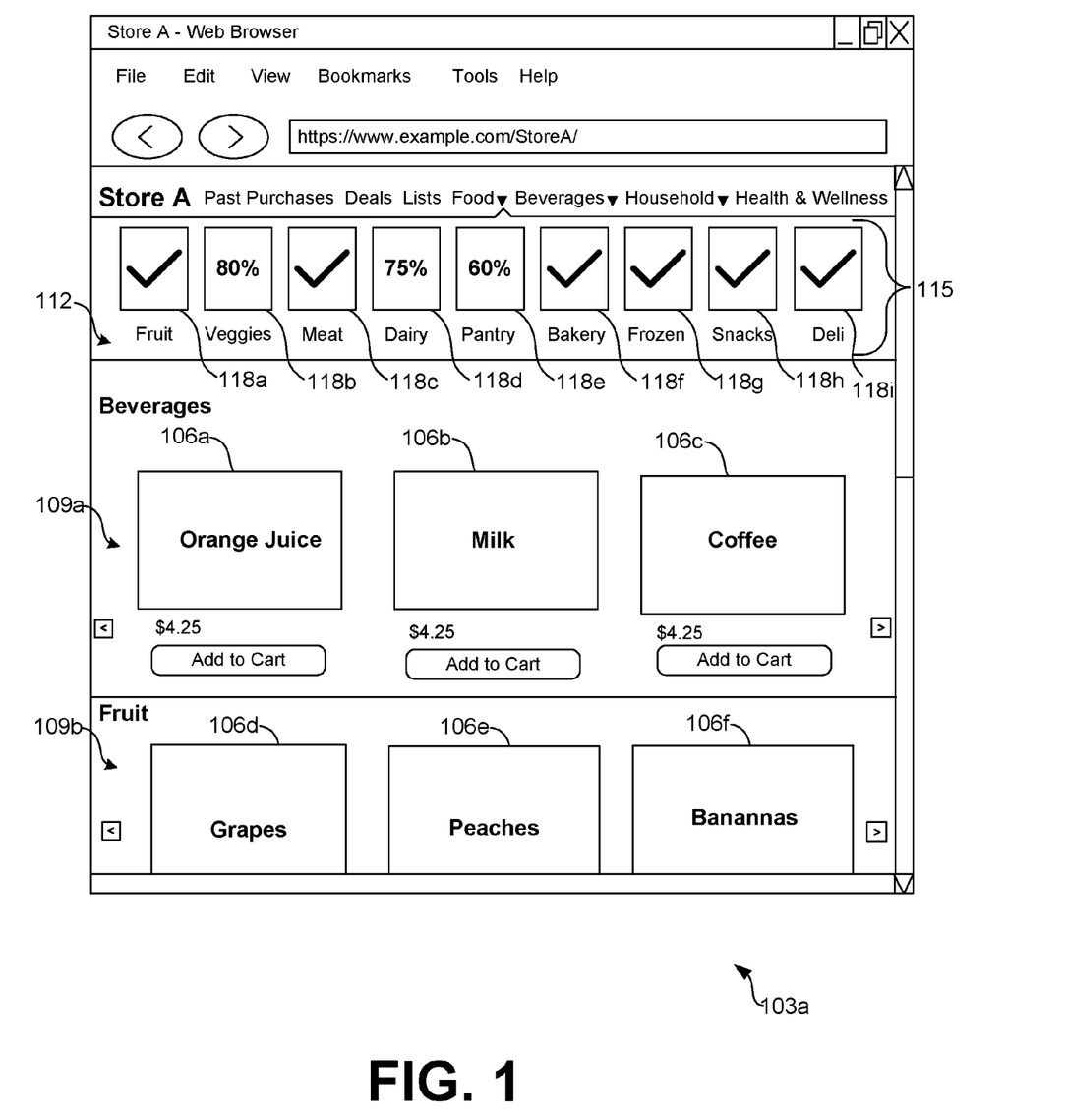
FIG. 1 is a drawing of an example user interface illustrating a navigation interface dynamically generated based on a navigation context for a user according to various embodiments of the present disclosure.

Turning now to FIG. 1, shown is an example user interface 103*a* that includes item listings 106 (e.g., 106*a*, 106*b*, 106*c*, 106*d*, 106*e*, 106*f*) that are arranged in aisles 109 (e.g., 109*a*, 109*b*) to allow a user to browse through items that are available for purchase, lease, rent, download, etc. according to various embodiments of the present disclosure. An aisle 109 is a dynamically generated grouping of items. For example, similar to a grocery store where different items are arranged in different grocery aisles, the aisles 109 included in the user interfaces 103 of the present disclosure can include items associated with a particular item category (e.g., beverages, dairy, produce, etc.). In some examples, an aisle 109 may also include items that are not included in a given item category but are determined to be included in the grouping of items according to other factors (e.g., complementary items, item on sale, trending item, vendor requested, etc.).

The example user interface 103*a* further includes a navigation interface 112 that is dynamically generated according to a user context. The navigation interface 112 includes a list of item categories 115 corresponding to different pages of the electronic commerce site that a user may wish to view. The navigation interface 112 further includes a plurality of navigation components 118 (e.g., 118*a*, 118*b*, 118*c*, 118*d*, 118*e*, 118*f*, 118*g*, 118*h*, and 118*i*) corresponding to the item categories 115. The navigation components 118 may be configured to, upon user interaction, trigger an action that redirects the client device to render to additional information about the given category 115. For example, in response to a user interaction (e.g., hover, selection, etc.) with a particular navigation component 118, the client device may be redirected to a landing page associated with the corresponding item category 115. In some examples, the client device may render an aisle-centric page that only contains item listings 106 for the incomplete aisles 109 or incomplete categories 115. In another non-limiting example, the user may be presented a user interface element (e.g., flyout, card component, popup box, etc.) that may provide a top-ranked listing of items within the given category 115 that the user may be interested in viewing and/or purchasing.

According to various embodiments, the navigation components 118 can be rendered by the client device and presented to the user in a way that allows the user to understand what areas (e.g., content, pages, etc.) of the electronic commerce site during a given shopping experience are incomplete (e.g., content includes reference to one or more items of interest to the user that user may not have interacted with) and which areas are complete and no longer need to be viewed. For example, in the example, of FIG. 1, some of the navigation components (e.g., 118*a*, 118*c*, and 118*f*-

118*i*) each include a checkmark that can indicate to the user that the user does not need to view content (e.g., category landing pages, aisles, etc.) associated with the corresponding category 115. In contrast, navigation components 118*b*, 118*d*, and 118*e* each indicate a percentage of completeness associated with the category 115 to indicate to the user that he or she may want to visit the areas in the electronic commerce site associated with the corresponding category 115.

For example, if a user is known to typically purchase "almond milk" during a particular context, it can be determined that the item has not yet been added to the shopping cart or that the user has not even been presented with the item listing for "almond milk." As such, the navigation component 118 corresponding to "dairy" products or some other relevant category or subcategory may include a visual indication to the user that the user should visit this portion of the electronic commerce site to browse and/or add additional relevant items (e.g., almond milk) to his or her shopping cart.

In the example of FIG. 1, the visual indicator for "dairy" includes a percentage. However, the visual indicator can include any type of visual display that can cause a user to understand a level of completeness associated with a given category 115. For example, the visual display of the navigation components 118 may include a numerical value indicating the level of completeness of the respective category based on the navigation context, a completeness symbol (e.g., checkmark, "X", etc.), a status interface, an emphasizing highlight (e.g., a color change, etc.), a deemphasizing highlight (e.g., grayed-out, transparent, strikethrough, etc.), or other type of visual display that indicates a level of completion for a given category 115. In other examples, the order of presentation of the categories and the navigation components 118 may be based on a level of completeness. For example, the category with the lowest level of completion may be placed first while the category 115 and corresponding navigation component 118 for the most complete or exhausted category 115 may be placed last.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to individually search an online catalog for items of interest; (2) improving the user experience in interacting with a computer system by automatically identifying item categories or areas that the user has not yet visited, so the user does not waste his or her time ending up at dead-ends in a navigation without finding desired items; (3) improving the functioning of the computing system through a more streamlined purchasing process that reduces user frustration when searching for other items; (4) improving the user experience in interacting with a computer system by providing a dynamically generated navigation interface to allow a user to easily access relevant items for a given context; and so forth. In the following discussion, a general description of the system and its components is provided, followed by a discussion of the operation of the same.

Figure 2:
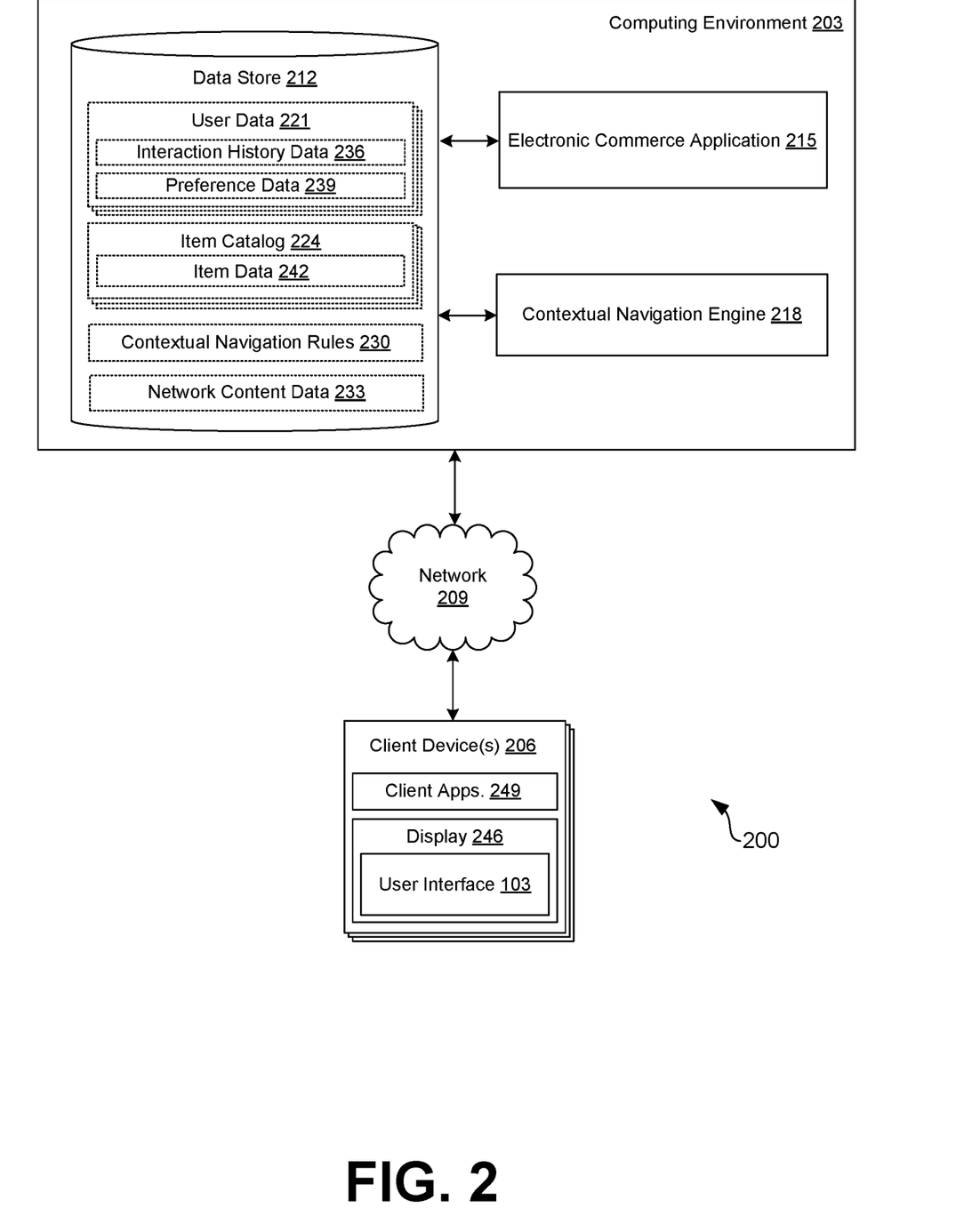
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include an electronic commerce application 215, a contextual navigation engine 218, and other applications, services, processes, systems, engines, or functionality not discussed in detail herein. The electronic commerce application 215 is executed to facilitate the online sale, download, lease, rent, etc. of items from one or more electronic commerce systems over the network 209. Such items may include products, goods, services, digital content, and/or other items. The electronic commerce application 215 also performs various backend functions associated with the online presence of an electronic commerce system in order to facilitate the online purchase of items. For example, the electronic commerce application 215 generates network pages such as, for example, web pages and/or other types of network content that are provided to client devices 206 for the purposes of promoting and selecting items for purchase, rental, download, lease, or any other forms of consumption.

The contextual navigation engine 218 is executed to determine a navigation context for a user account during a given shopping experience via interactions with the electronic commerce application 215. The navigation context can be based on a variety of factors such as for example, store brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during active shopping experience (e.g., searching behavior, browsing behavior, and add to cart behavior), aggregate user interaction behavior (e.g., interaction behavior of multiple user accounts, item availability (e.g., inventory, delivery capacity), event notice (e.g., emergency, road closure, etc.), time (e.g., year, day, week), seasonality, and/or other factors as can be appreciated. It should be noted that some of the factors can be static (e.g., store brand, store location, user eligibility status, etc.) while other of the factors can be dynamic (e.g., interaction behavior, user interaction history, time, etc.).

In various embodiments, the contextual navigation engine 218 can generate a navigation context based on an analysis of the factors. In some examples, the contextual navigation engine 218 can select items from the item catalog 224 that may be of interest to the user account based on the analysis of the various factors and the generated navigation context. For example, assume that the user is currently interacting with Store A in the electronic commerce application 215. Further, assume that the time of the interaction is on a Saturday evening in the summertime, and that the user has already added a variety of items to a shopping cart. The contextual navigation engine 218 can analyze the factors to determine a navigation context that can be used to identify additional items offered by Store A that are known to be of interest to the user and/or an aggregate of users in similar contexts. As such, the navigation context for the user can be used to determine a framework for how a user can navigate through the electronic commerce application 215 and become exposed to the relevant items that are specific to the user.

In some examples, the contextual navigation engine 218 can generate the navigation interface 112 including the navigation components 118 based on the defined navigation context and selected items. In other examples, the electronic commerce application 215 can generate the navigation interface 112 and corresponding navigation components 118 based at least in part on the navigation context provided to the electronic commerce application 215 from the contextual navigation engine 218. In some examples, the contextual navigation engine 218 is incorporated within the electronic commerce application 215. In other examples, the contextual navigation engine 218 is a standalone application.

The data stored in the data store 212 includes, for example, user data 221, an item catalog 224, contextual navigation rules 230, network content data 233, and potentially other data. The user data 221 includes various data collected from or generated by users and/or customers having accounts in an electronic commerce site facilitated by the electronic commerce application 215. The user data 221 may include interaction history data 236, preference data 239, account address(es), payment instrument data, authentication information, and/or other data associated with a user or user account of the electronic commerce site.

The interaction history data 236 may include information specific to a user account such as, for example, a purchase history (including purchase frequency, purchase cadence, purchase recency, etc.), a browsing history, a viewing history, a rating history, a search history, and/or other information that reflects a prior interaction by the user account with the computing environment 203. The preference data 239 may include information related to preferences of items, item attributes, brands of items, quality of items, quantity of items, and/or other information.

The item catalog 224 includes item data 242 regarding items offered through the electronic commerce application 215. Such items may include products, goods, services, digital content, and/or other items that can be offered for sale, lease, rent, download, etc. The items in the item catalog 224 may be organized according to a taxonomy of categories. For example, the items in the item catalog 224 may be categorized according to an item type with various item attributes further defining a placement of an item in the taxonomy. For example, milk and cheese can include two branches of the taxonomy under a category for "dairy." Further, the category associated with milk, for example, may further include branches according to type, flavoring, fat percentage, organic features, and so on.

The item data 242 may include item attributes, an item identifier, descriptions, weights, prices, quantities available, export restrictions, customer reviews, customer ratings, images, videos, version information, availability information, shipping information, and/or other data. Item attributes can include specific characteristics that define a given item. For example, item attributes can include size, color, weight, packaging, quantity, freshness, ripeness, nutritional values, how the item is processed, brand, seasonality (e.g., fall, winter, spring, summer, holidays, etc.), associated activities (e.g., celebration, weddings, picnics, sporting events, etc.), hazardous classification, fragility, import/export restrictions, and/or other attributes as can be appreciated.

The contextual navigation rules 230 include rules, models, and/or configuration data for the various algorithms or approaches employed by the contextual navigation engine 218. For example, the contextual navigation rules 230 can include the various models and/or algorithms used by the contextual navigation engine 218 in determining a navigation context for a user which is used for generating the navigation interface 112 and navigation components 118 within the navigation interface 112.

The network content data 233 may include various data employed by the electronic commerce application 215 and/or the contextual navigation engine 218 in generating user interfaces 103, the navigation interface 112, and/or other network pages. The network content data 233 may include hypertext markup language (HTML), extensible markup language (XML), cascading style sheets (CSS), images, text, audio, video, templates, and/or other data.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 246. The display 246 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 249 and/or other applications. The client application 249 may be executed in a client device 206, for example, to access network content served up by the computing environment 203 and/or other servers, thereby rendering a user interface 103 on the display 246, To this end, the client application 249 may comprise, for example, a browser, a dedicated application, etc., and the user interface 103 may comprise a network page, an application screen, etc. The client device 206 may be configured to execute applications beyond the client application 249 such as, for example, email applications, social networking applications, word processors, spreadsheets, and/or other applications.

Figure 3A:
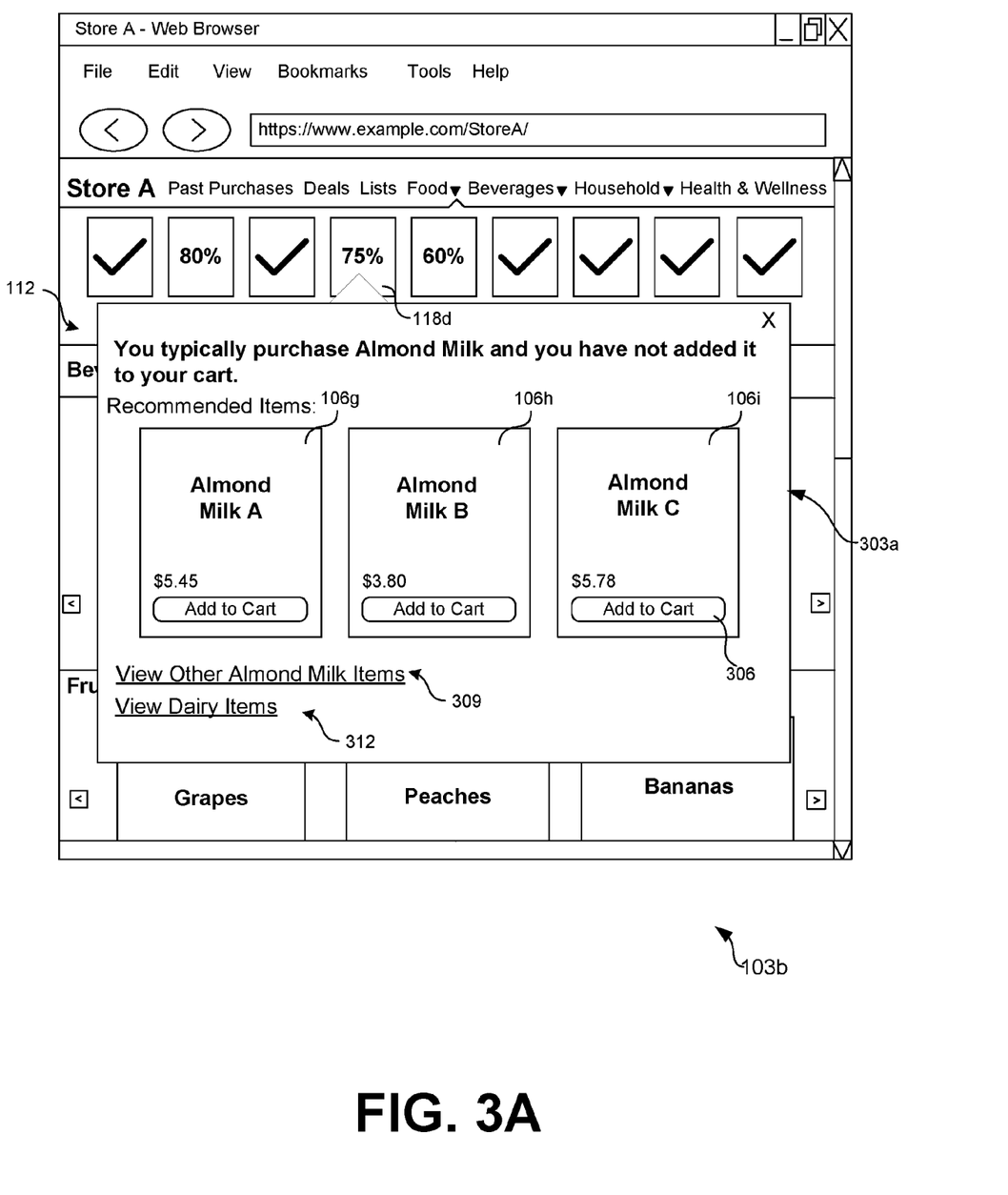
FIGS. 3A-3B are pictorial diagrams of example user interfaces rendered by a client device in the networked environment of FIG. 2 according to various embodiments of the present disclosure.
Figure 3B:
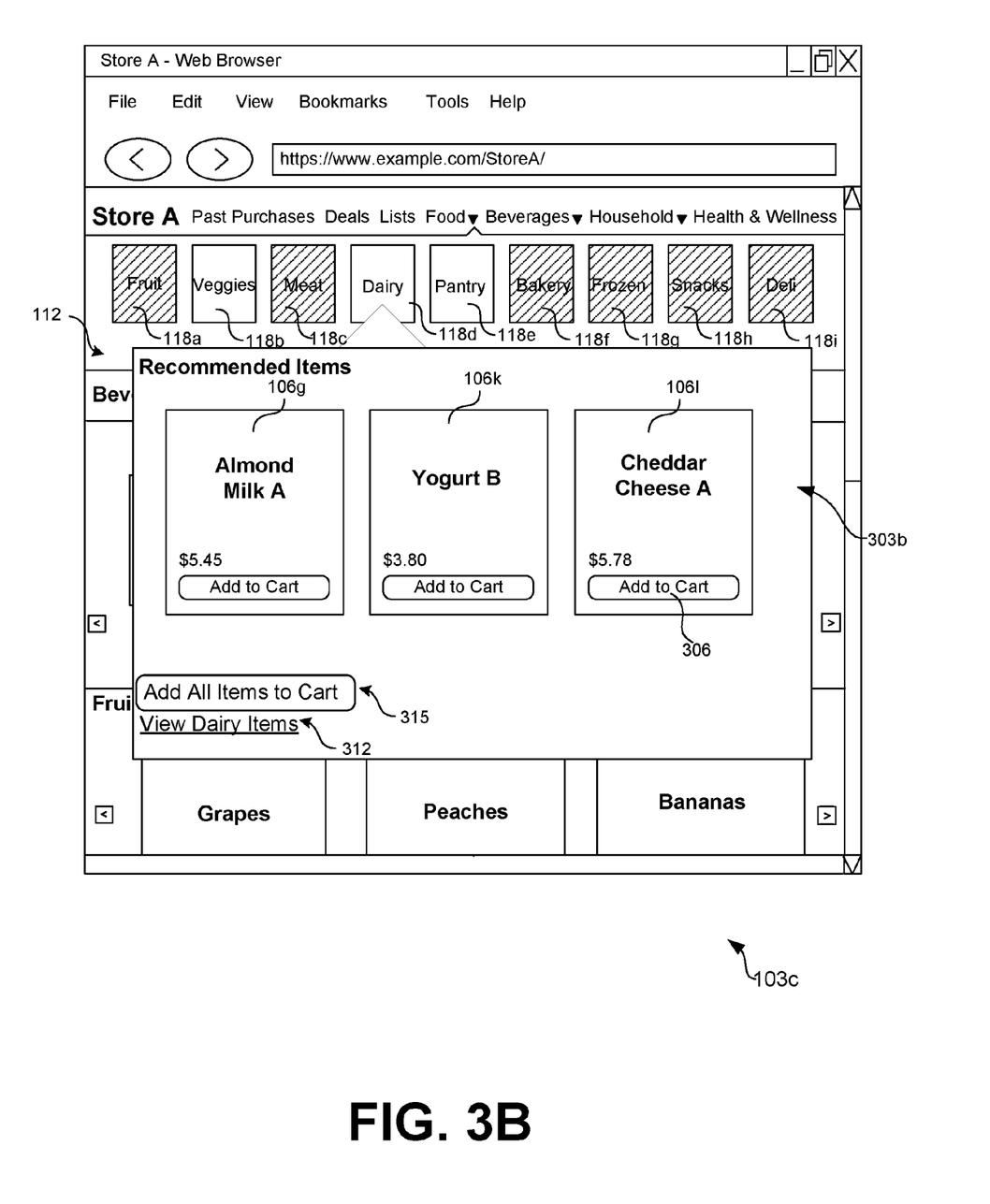

Referring next to FIGS. 3A and 3B, shown are example user interfaces 103b, and 103c that illustrate examples interactions with the dynamically generated navigation interface 112 as discussed with respect to FIG. 1. For example, FIG. 3A illustrates a user interface element 303a that is shown as an overlay above the example user interface 103a of FIG. 1. The user interface element 303a is generated and produced in response to a user interaction with the navigation component 118d that is associated with the category of "dairy." The user interaction can include a hover action over a defined area associated with the navigation component 118d, a selection of the navigation component 118d, or other type of user interaction as can be appreciated.

In response to detecting the user interaction, the electronic commerce application 215 or the client application 249 via user interface code provided from the electronic commerce application 215 can generate the user interface element 303a to provide additional information associated with the given category to the user. In the example of FIG. 3A, the user interface element 303a includes item listings 106g, 106h, 106i for "almond milk." For example, based on the navigation context, it may be determined that the user typically purchases almond milk, but during the current experience, the user has yet to add almond milk to the shopping cart. In this example, there are different types of item listings 106 for almond milk. According to various examples, the electronic commerce application 215 may select a subset of items for almond milk to recommend to the user based on a variety of factors including, interaction history data 236, preference data 239, aggregate user interaction history, item popularity, item brand, item price, and/or other factors. Each item listing 106 further includes an add-to-cart component 306 which can allow the user, via selection by the user, to add the item associated with the item listing 106 to the shopping cart without further navigation through the electronic commerce application 215. Although FIG. 3A illustrates an add-to-cart component 306 that adds the item to the shopping cart, in various embodiments, the user interface elements 303 of the present disclosure can include single-click order components that allow a user to automatically initiate a transaction associated with a given item with a single-click of the component.

In addition, the user interface element 303a can include a sub-category link 309 and/or a category link 312. The sub-category link 309 can be configured to redirect the user to a user interface 103 that includes item listings 106 in a given sub-category. In this example, the sub-category link 309 can redirect the user to a user interface 103 that includes a listing of the different almond milks offered by Store A in the electronic commerce application 215 where almond milk is a subcategory to dairy.

The category link 312 can be configured to redirect the user to a user interface 103 that includes item listings 106 for the given category (e.g., dairy) and/or aisles 109 that include the item listings 106 for the given category (e.g. dairy). As such, the dynamic navigation interface 112 through user interactions with the navigation components 118 can direct the user to a place of interest to view items that are determined to be relevant to the user based on the determined context.

Moving on to FIG. 3B, shown is example of another user interface element 303b that can be generated and presented to the user in response to a user interaction with a navigation component 118 of the navigation interface 112. This user interface element 303b differs from the user interface element 303a in FIG. 3A in that the user interface element 303b provides multiple recommended item listings 106g, 106k, and 106l for different types of items that are determined to be relevant to the user based on the navigation context. In this example, the electronic commerce application 215 can determine that the user has not yet added these expected items (e.g., almond milk, yogurt, and cheddar cheese) from the dairy category into his or her shopping cart. As such, these items can be presented in a user interface element 303b in response to a user interaction. Similar to the user interface element 303a of FIG. 3A, the item listings 106 further include an add-to-cart component 306 that upon selection add the corresponding item to the user's shopping cart. FIG. 3B also includes a category link 312 to redirect the user to a user interface 103 that includes item listings 106 for the given category. In addition, FIG. 3B includes an add-all-to-cart component 315 that, upon user selection, adds all of the items from the displayed item listings 106 to the user's shopping cart. Although FIG. 3B illustrates an add-all-to-cart component 306 that adds all displayed items to the shopping cart, in various embodiments, the user interface elements 303 of the present disclosure can further include a single-click order component that allows a user to automatically initiate a transaction associated with the displayed items with a single-click of the component.

Further, to illustrate an alternative way of indicating a level of completeness to the user, the visual display for each of the corresponding navigation components 118 in FIG. 3B differ from those of FIG. 1. For example, instead of indicating a complete category with a checkmark on each navigation component 118 (e.g., 118a, 118c, 118f, 118g, 118h, and 118i) for a completed category, as shown in FIGS. 1 and 3A, the navigation components 118 (e.g., 118a, 118c, 118f, 118g, 118h, and 118i) for the completed categories of FIG. 3B are displayed with a deemphasizing highlight. These examples are not meant to be exclusive or limiting embodiments, as there can be many different modifications to the visual displays of the navigation components 118 to indicate a level of completeness.

Although the user interface element 303 of FIGS. 3A and 3B illustrates a popup box, the user interface elements 303 of the present disclosure can comprise an overlay, an inline expansion, a card component, and/or other type of user interface element as can be appreciated. It should be noted that FIGS. 3A-3B illustrate example user interfaces 103 associated with desktop or laptop device views. However, the user interfaces 103 can be generated for use on mobile devices, desktop devices, and/or laptop devices, respectively, and can be interchanged as can be appreciated. In some examples, user interfaces 103 may be adapted to accept user interactions for mobile view or desktop or laptop devices views as can be appreciated.

Figure 4:
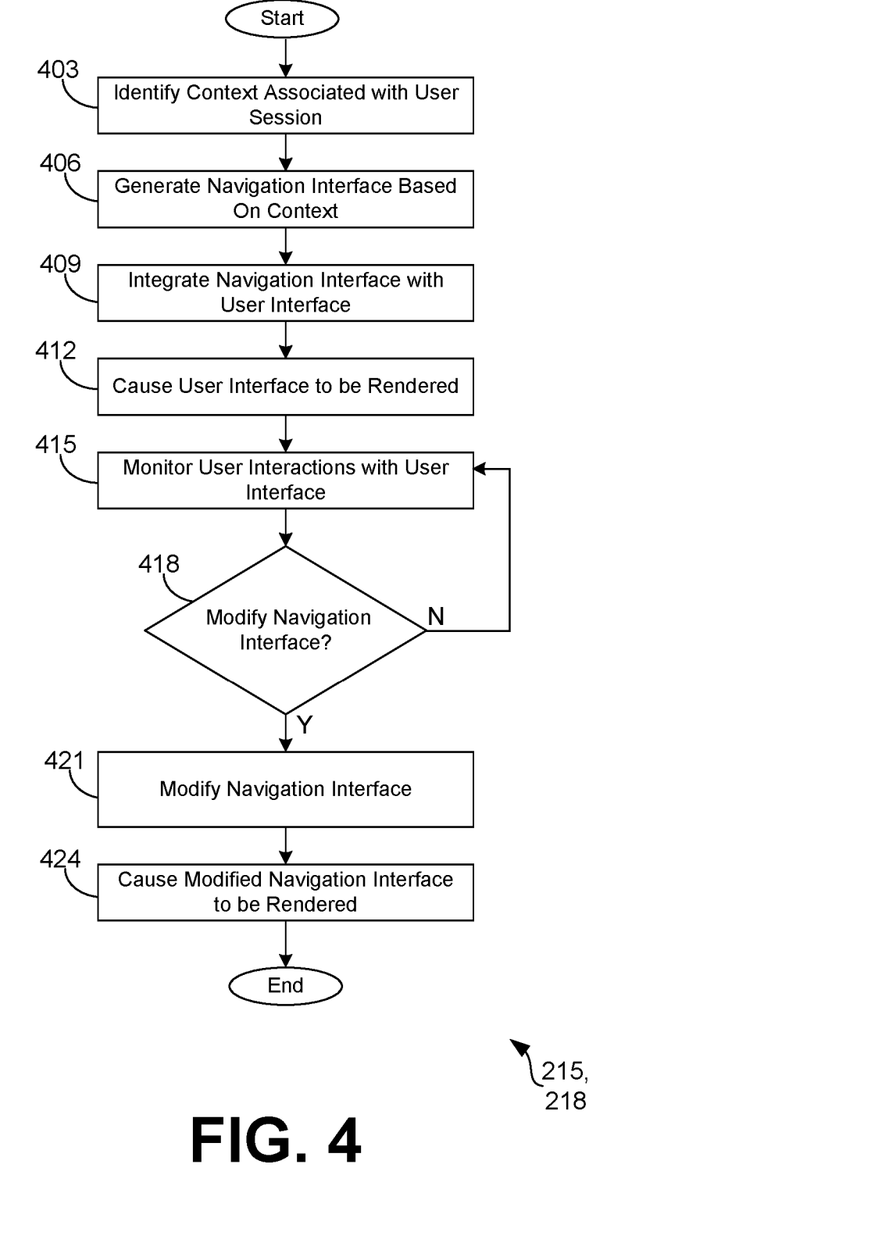
FIGS. 4-7 are flowcharts illustrating examples of functionality implemented as portions of the electronic commerce application and the contextual navigation engine executed in a computing environment in the networked environment of FIG. 2 according to various embodiments of the present disclosure.

Referring next to FIG. 4, shown is a flowchart that provides one example of the operation of portions of the electronic commerce application 215 and the contextual navigation engine 218, according to various embodiments. It is understood that the flowchart of FIG. 4 provides merely an example of the many different types of functional arrangements that may be employed to implement the operation of the portions of the electronic commerce application 215 and the contextual navigation engine 218, as described herein. As an alternative, the flowchart of FIG. 4 may be viewed as depicting an example of elements of a method implemented in the computing environment 203 (FIG. 2) according to one or more embodiments.

Beginning with box 403, the contextual navigation engine 218 identifies a navigation context associated with a user session of a user interacting with the electronic commerce application 215. The navigation context can be based on a variety of factors such as for example, store brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during active shopping experience (e.g., searching behavior, browsing behavior, and add to cart behavior), item availability (e.g., inventory, delivery capacity), event notice (e.g., emergency, road closure, etc.), time (e.g., year, day, week), seasonality, and/or other factors as can be appreciated. It should be noted that some of the factors can be static (e.g., store brand, store location, user eligibility status, etc.) while other of the factors can be dynamic (e.g., interaction behavior, user interaction history, time, etc.).

According to various embodiments, the contextual navigation engine 218 may apply the contextual navigation rules 230 to identify or otherwise generate a navigation context based on an analysis of the factors. In some examples, the contextual navigation engine 218 can select items from the item catalog 224 that may be of interest to the user based on the analysis of the various factors and the generated navigation context. The navigation context can be used to define a navigation framework that ensures that the user is aware of where he or she is, in a given shopping experience and to make sure that the user is exposed to items that are considered relevant to the user given the current context.

At box 406, the contextual navigation engine 218 generates the navigation interface 112 based at least in part on the navigation context. The navigation interface 112 can be generated to include navigation components 118 that can redirect the client device to different areas (e.g., webpages) in the electronic commerce application 215. The navigation components 118 each correspond to a different category 115 or sub-category defined by the taxonomy of the item catalog 224. The navigation context can define which categories may be of interest to the user based at least in part on which items are determined to be of interest to the user for the given context.

According to various embodiments, the navigation components 118 can be configured to, upon user interaction, redirect the user to additional information associated with the given category 115. For example, as discussed with respect to FIGS. 3A and 3B, a user interaction with a given navigation component 118 can cause a user interface element 303 to be generated and rendered. The user interface element 303 can indicate item listings 106 of items that may be of interest to the user based on the navigation context. In some examples, a user interaction with a navigation component 118 can redirect the user to a user interface 103 that includes the item listings 106 for the given category 115.

In various embodiments, the contextual navigation engine 218 can generate the navigation components 118 such that each navigation component 118 includes a visual indicator that defines the level of completeness for a given category 115. For example, the visual display of the navigation components 118 may include a numerical value indicating the level of completeness of the respective category based on the navigation context, a completeness symbol (e.g., checkmark, "X", etc.), a status interface, an emphasizing highlight (e.g., a color change, etc.), a deemphasizing highlight (e.g., grayed-out, transparent, strikethrough, etc.), or other type of visual display that indicates a level of completion for a given category 115. In other examples, the order of presentation of the categories 115 and the navigation components 118 may be based on a level of completeness. For example, the category with the lowest level of completion may be placed first while the category 115 and corresponding navigation component 118 for the most complete or exhausted category 115 may be placed last.

It should be noted that although the discussion relates to the contextual navigation engine 218, in some examples, the electronic commerce application 215, or other application, can generate the navigation interface 112 based at least in part on the navigation context generated by the contextual navigation engine 218.

At box 409, the electronic commerce application 215 integrates the navigation interface 112 into the user interface 103 provided to the user. In some examples, the electronic commerce application 215 may generate user interface code that is provided to the client application 249 for generating the user interface 103 that includes the electronic commerce content (e.g., item detail pages, item listings, search results, etc.) and the navigation interface 112. In other examples, the electronic commerce application 215 generates the user interface 103 with the electronic commerce content and navigation interface 112.

At box 412, the electronic commerce application 215 causes the user interface 103 to be rendered on the client device 206. As discussed above, the electronic commerce application 215 may transmit user interface code that can be executed by the client application 249 to generate and render the user interface 103 on the client device 206. In other examples, the electronic commerce application 215 can transmit the generated user interface 103 to the client device 206 for rendering. For example, the electronic commerce application can send data associated with the generated user interface 103 in response to an application programming interface (API) call from the client application 249.

At box 415, the electronic commerce application 215 can monitor user interactions with the user interface 103. For example, as the user interacts with the user interface 103 rendered on the client device 206, the client application 249 can transmit interaction data to the electronic commerce application 215 identifying the various interactions of the user. The interactions can include selection actions, scrolling actions, hovering actions, purchasing actions (e.g., adding to cart), browsing actions, and/or other type of interactions that can be appreciated.

At box 418, the contextual navigation engine 218 can determine whether the navigation interface 112 should be updated based on an updated of navigation context. For example, the contextual navigation engine 218 can update the navigation context based on data associated with the monitored interactions. The contextual navigation engine 218 can update the navigation context periodically, randomly, or in real-time. As discussed, some of the navigation factors are dynamic (e.g., current interaction behavior, interaction history, time, etc.) which can change the navigation context over time. For example, if the original navigation context identifies items in the dairy category that the user may want to purchase, and the user, through the interactions, added the identified items to the cart, the navigation context may be updated to reflect that the user may no longer need to browse the dairy aisle. If the navigation interface 112 is to be updated, the contextual navigation engine 218 can proceed to box 424. Otherwise, the contextual navigation engine 218 returns to box 415 to monitor user interactions with the user interface 103.

At box 421, the contextual navigation engine 218 modifies the navigation interface 112 based on the updated navigation context. For example, the contextual navigation engine 218 may reorder the placement of the navigation components 118 based on the updated context and a determination that one category 115 may have a lower level of completeness than another category 115. In another example, the contextual navigation engine 218 may modify the visual display of one or more of the navigation components 118 to reflect a change in the level of completeness.

At box 424, the electronic commerce application 215 causes the modified navigation interface to be rendered within the current user interface 103 rendered on the client device 206. In some examples, the electronic commerce application 215 integrates the navigation interface 112 into the user interface 103 to be displayed and transmits the user interface 103 to the client device 206. In other examples, the electronic commerce application 215 transmits data to the client application 249 that can be used by the client application 249 to generate and render the modified navigation interface 112. Thereafter, this portion of the process proceeds to completion.

Figure 5:
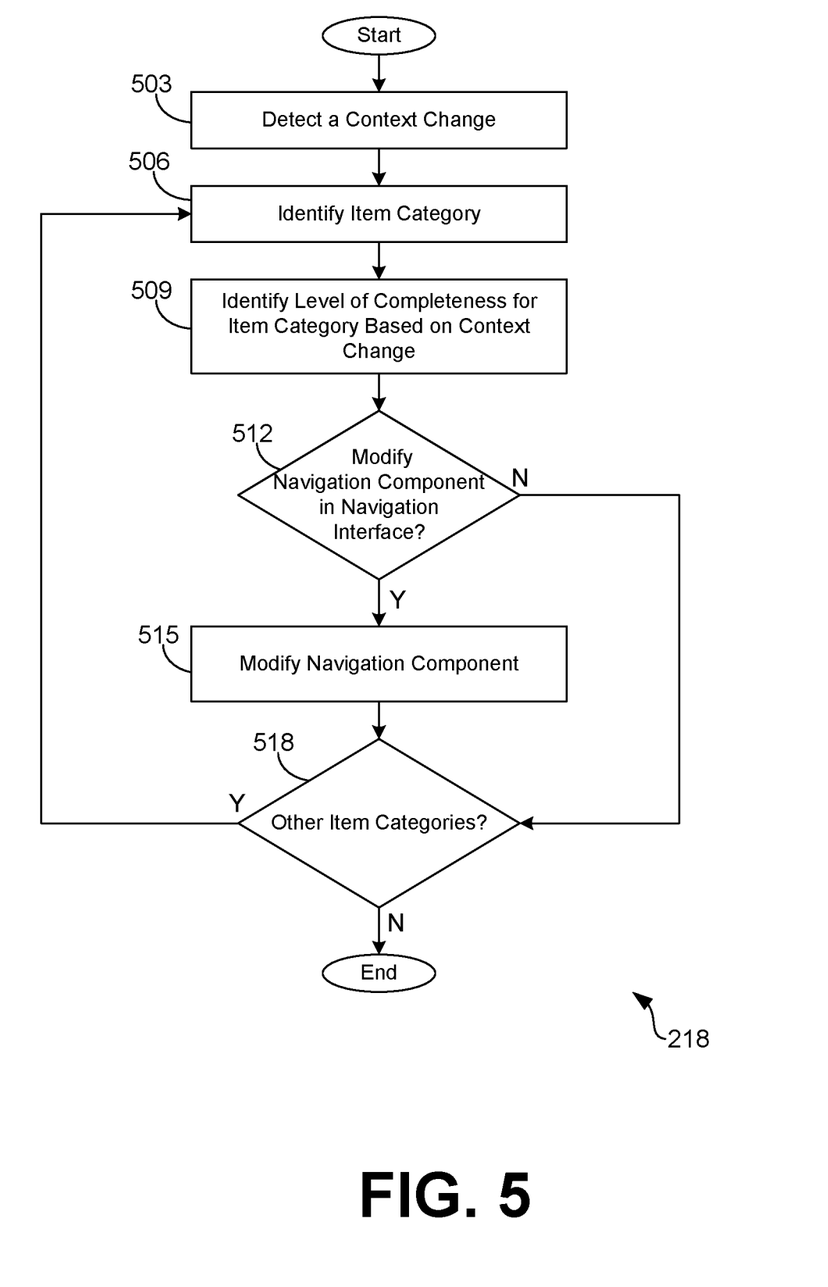

Referring next to FIG. 5, shown is a flowchart that provides one example of the operation of a portion of the contextual navigation engine 218, according to various embodiments. It is understood that the flowchart of FIG. 5 provides merely an example of the many different types of functional arrangements that may be employed to implement the operation of the portion of the contextual navigation engine 218, as described herein. As an alternative, the flowchart of FIG. 5 may be viewed as depicting an example of elements of a method implemented in the computing environment 203 (FIG. 2) according to one or more embodiments.

Beginning with box 503, the contextual navigation engine 218 may detect a change in the navigation context. For example, the contextual navigation engine 218 can analyze the monitored interactions to detect a change in the navigation context. The contextual navigation engine 218 can analyze the received data and other navigation changes to determine if there has been a change in the navigation context. This analysis can occur periodically, randomly, or in real-time. As discussed, some of the navigation factors are dynamic (e.g., current interaction behavior, interaction history, time, etc.) which can change the navigation context over time. In some situations, the contextual navigation rules 230 can determine whether a change in a context factor constitutes a change in the navigation context. For example, a purchase of an item that was identified in the navigation context can correspond to a change in the navigation context. However, a change in time may not correspond to a change in the navigation context if the time is included within a time range defined in the contextual navigation rules 230.

At box 506, the contextual navigation engine 218 can identify an item category 115 associated with the detected change. For example, if the navigation context change corresponds to the purchase of an item in the dairy category, the dairy category is identified at this box. In other examples, all item categories 115 that are presented in the navigation interface 112 may be affected by the context change. As such, the contextual navigation engine 218 will select a category from the list of categories 115.

At box 509, the contextual navigation engine 218 determines a level of completeness for the item category 115 based on the context change. For example, the level of completeness may change in a situation where the change in navigation context is based on the addition of an item or other type of interaction that the contextual navigation engine 218 identifies as being relevant or otherwise of interest to the user based on a navigation context. In this example, the contextual navigation engine 218 can determine based on the navigation context if the user has completed viewing or interacting with all items determined to be relevant or otherwise of interest to the user. Interactions with the items can include viewing the items, loading an item detail page associated with the item, scrolling below-the-fold of the presently rendered user interface 103, viewing images associated with the item, viewing customer reviews of the item, and/or other types of interactions. In some examples, the contextual navigation engine 218 can analyze the different types of interactions with a particular item to determine if the interaction qualify as a complete interaction. For example, the contextual navigation engine 218 may generate a score based on a sum of weights assigned to the different types of interactions. If the score meets or exceeds a predefined threshold, the item may be considered to have been "interacted with."

If all of the items have been interacted with, the contextual navigation engine 218 may determine that the level of completeness is one-hundred percent or fully complete. Otherwise, the contextual navigation engine 218 may determine the level of completeness by determining a ratio or percentage based on the number of items in the category that have been interacted with respect to the number of items in the category that the user has not interacted with and that are determined to be relevant to the user based on the navigation context.

At box 512, the contextual navigation engine 218 determines whether the navigation component 118 for the item category 115 is to be modified in the navigation interface 112 based on the identified level of completeness. For example, the display region of the navigation component 118 may need to be modified to accurately reflect the level of completeness. In another example, the order of placement of the navigation component 118 may change based on the level of completeness in comparison to the level of completeness for other navigation components 118. If the navigation component 118 is to be modified, the contextual navigation engine 218 proceeds to box 515. Otherwise, the contextual navigation engine 218 proceeds to box 518.

At box 515, the contextual navigation engine 218 modifies the navigation component 118. For example, the contextual navigation engine 218 may reorder the placement of the navigation component 118 based on the changed navigation context and a determination that one category 115 may have a lower level of completeness than another category 115. In another example, the contextual navigation engine 218 may modify the visual display of one or more of the navigation components 118 to reflect a change in the level of completeness.

At box 518, the contextual navigation engine 218 determines if there are other item categories 115 to update. If there are additional item categories 115 to review, the contextual navigation engine 218 returns to box 506. Otherwise, this portion of the process proceeds to completion.

Figure 6:
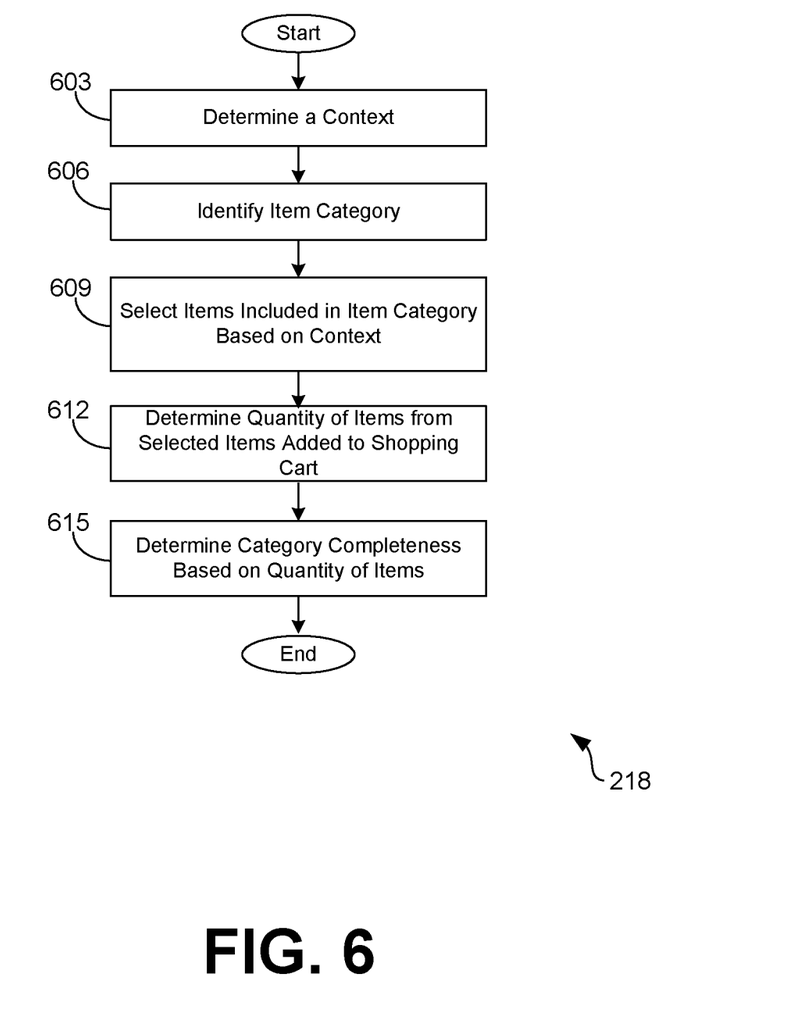

Referring next to FIG. 6, shown is a flowchart that provides one example of the operation of a portion of the contextual navigation engine 218, according to various embodiments. It is understood that the flowchart of FIG. 6 provides merely an example of the many different types of functional arrangements that may be employed to implement the operation of the portion of the contextual navigation engine 218, as described herein. As an alternative, the flowchart of FIG. 6 may be viewed as depicting an example of elements of a method implemented in the computing environment 203 (FIG. 2) according to one or more embodiments.

Beginning with box 603, the contextual navigation engine 218 determines a navigation context for a user interacting with the electronic commerce application 215. As discussed, the navigation context can be based on a variety of factors such as for example, store brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during active shopping experience (e.g., searching behavior, browsing behavior, and add to cart behavior), item availability (e.g., inventory, delivery capacity), event notice (e.g., emergency, road closure, etc.), time (e.g., year, day, week), seasonality, and/or other factors as can be appreciated. According to various embodiments, the contextual navigation engine 218 may apply the contextual navigation rules 230 to identify or otherwise determine a navigation context based on an analysis of the factors.

At box 606, an item category 115 is selected. The item category 115 can be a particular item category 115 defined by the taxonomy of the item catalog 224. The item category 115 can be based on one or more items defined by the navigation context.

At box 609, the contextual navigation engine 218 can select items including the item category based on the navigation context. For example, the navigation context may define one or more items that may be of interest to the user based on the context. As such, the one or more items that fall under the item category 115 based on the taxonomy defined in the item catalog 224 may be selected by the contextual navigation engine 218.

At box 612, the contextual navigation engine 218 determines a quantity of items from the selected items that have already been added or otherwise interacted with by the user during a given shopping session. For example, if the user has interacted with and/or added to the shopping cart, five of the items from the selected items, the contextual navigation engine 218 will determine the quantity of items to be five.

At box 615, the contextual navigation engine 218 determines a level of completeness for the item category 115 based on the quantity of items. For example, the contextual navigation engine 218 may determine the level of completeness by determining a ratio or percentage based on the number of items in the category that have been interacted with respect to the number of items in the category that are determined to be relevant to the user based on the navigation context that the user has not interacted with. Thereafter, this portion of the process proceeds to completion.

Figure 7:
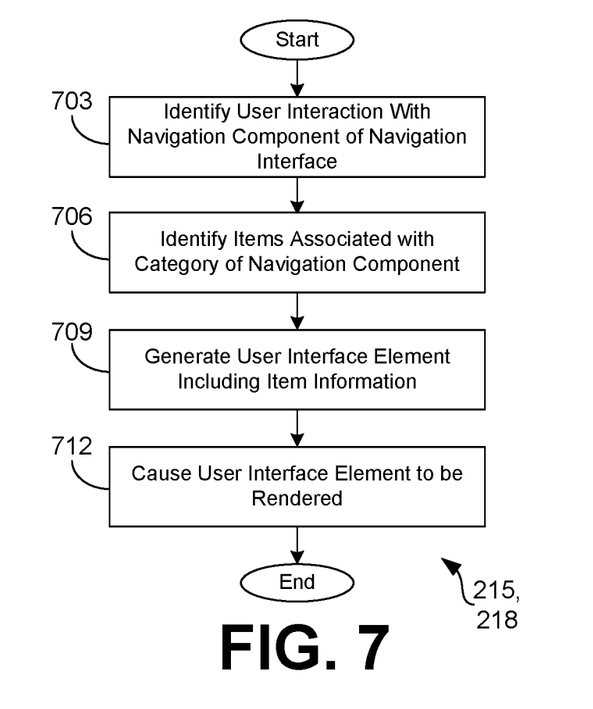

Referring next to FIG. 7, shown is a flowchart that provides one example of the operation of portions of the electronic commerce application 215 and the contextual navigation engine 218, according to various embodiments. It is understood that the flowchart of FIG. 7 provides merely an example of the many different types of functional arrangements that may be employed to implement the operation of the portions of the electronic commerce application 215 and the contextual navigation engine 218, as described herein. As an alternative, the flowchart of FIG. 7 may be viewed as depicting an example of elements of a method implemented in the computing environment 203 (FIG. 2) according to one or more embodiments.

Beginning with box 703, the electronic commerce application 215 identifies a user interaction with a navigation component 118 of the navigation interface 112. For example, as a user interacts with the user interface 103, the client application 249 can transmit a request associated with the interaction to the electronic commerce application 215 indicating the user interaction. In some examples, the interaction is a selection of the navigation component 118. In other examples, the user interaction can comprise a hover action of a defined display region of the navigation component 118.

At box 706, the electronic commerce application 215 can identify item listings 106 that may be of interest to the user based on the navigation context. For example, the electronic commerce application 215 may determine, based on the context, that the user typically purchases certain items from the category 115 and that the user has not interacted with or otherwise added the items to the shopping cart during the current shopping experience. As such, one or more of these items can be selected by the electronic commerce application 215.

At box 709, the electronic commerce application 215 generates a user interface element including additional information about the item category 115. For example, the additional information can include item listings 106 for the identified items, a sub-category link 309, an add-all-to-cart component 315, a category link 312, or other type of information associated with the item category. The user interface element 303 can comprise an overlay, a popup box, an inline expansion, a card component, and/or other types of user interface elements as can be appreciated.

At box 712, the electronic commerce application 215 can cause the user interface element to be rendered on the client device 206. In some examples, the electronic commerce application 215 can transmit data to the client device. In this example, the client application 249 can receive the data and use the data to generate and render the user interface element 303 on the client device 206. In other examples, the electronic commerce application 215 can transmit the user interface 103 with the user interface element 303 to the client device for rendering. Thereafter, this portion of the process proceeds to completion.

It should be noted that although the discussion of the steps of FIG. 7 were discussed as being performed by the electronic commerce application 215, in some embodiments, the contextual navigation engine 218 can perform any one of the steps as can be appreciated.

Figure 8:
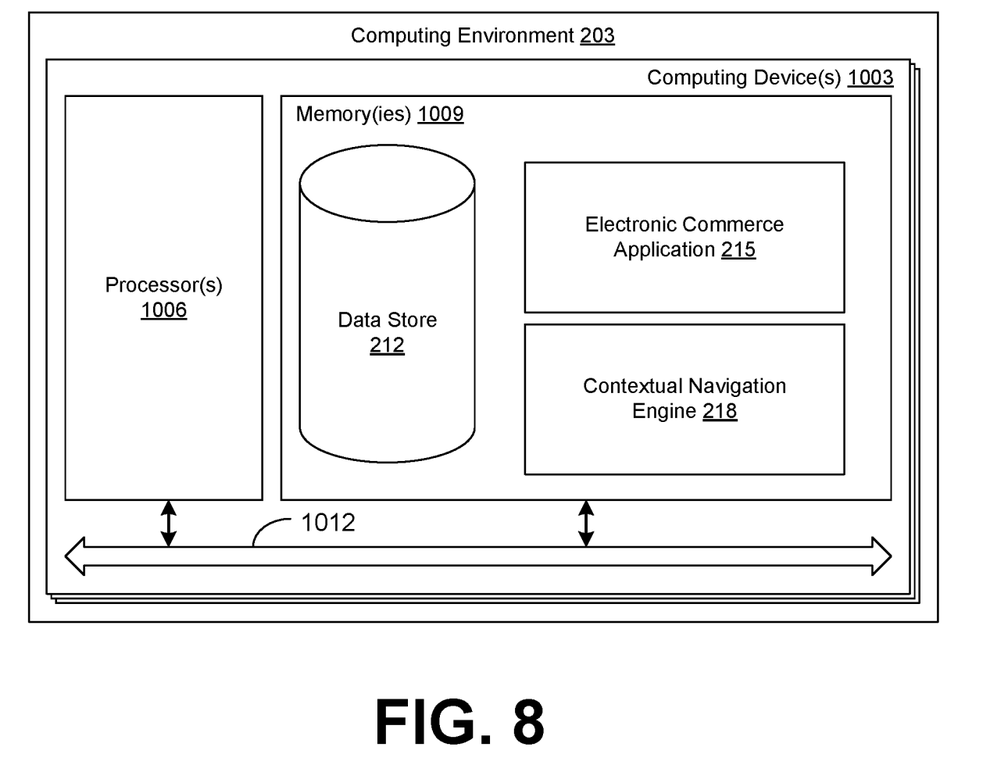
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 1003. Each computing device 1003 includes at least one processor circuit, for example, having a processor 1006 and a memory 1009, both of which are coupled to a local interface 1012. To this end, each computing device 1003 may comprise, for example, at least one server computer or like device. The local interface 1012 may comprise, for example, a data bus with an accompanying address/control bus or other bus structure as can be appreciated.

Stored in the memory 1009 are both data and several components that are executable by the processor 1006. In particular, stored in the memory 1009 and executable by the processor 1006 are the electronic commerce application 215, the contextual navigation engine 218, and potentially other applications. Also stored in the memory 1009 may be a data store 212 and other data. In addition, an operating system may be stored in the memory 1009 and executable by the processor 1006.

It is understood that there may be other applications that are stored in the memory 1009 and are executable by the processor 1006 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1009 and are executable by the processor 1006. In this respect, the term "executable" means a program file that is in a form that can ultimately be run by the processor 1006. Examples of executable programs may be, for example, a compiled program that can be translated into machine code in a format that can be loaded into a random access portion of the memory 1009 and run by the processor 1006, source code that may be expressed in proper format such as object code that is capable of being loaded into a random access portion of the memory 1009 and executed by the processor 1006, or source code that may be interpreted by another executable program to generate instructions in a random access portion of the memory 1009 to be executed by the processor 1006, etc. An executable program may be stored in any portion or component of the memory 1009 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1009 is defined herein as including both volatile and nonvolatile memory and data storage components. Volatile components are those that do not retain data values upon loss of power. Nonvolatile components are those that retain data upon a loss of power. Thus, the memory 1009 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1006 may represent multiple processors 1006 and/or multiple processor cores and the memory 1009 may represent multiple memories 1009 that operate in parallel processing circuits, respectively. In such a case, the local interface 1012 may be an appropriate network that facilitates communication between any two of the multiple processors 1006, between any processor 1006 and any of the memories 1009, or between any two of the memories 1009, etc. The local interface 1012 may comprise additional systems designed to coordinate this communication, including, for example, performing load balancing. The processor 1006 may be of electrical or of some other available construction.

Although the electronic commerce application 215, the contextual navigation engine 218, the client application 249, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-7 show the functionality and operation of an implementation of portions of the electronic commerce application 215, the contextual navigation engine 218, and the client application 249. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1006 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215, the contextual navigation engine 218, and the client application 249, that comprises software or code can be embodied in any non-transitory computer-readable medium for use by or in connection with an instruction execution system such as, for example, a processor 1006 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215, the contextual navigation engine 218, and the client application 249, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable in the at least one computing device, wherein when executed the at least one application causes the at least one computing device to at least:
   generate a user interface comprising a dynamic navigation interface in a first region and a plurality of items in a second region, the plurality of items being associated with one or more of a plurality of categories;
   generate, within the dynamic navigation interface, a plurality of category components, individual category components of the plurality of category components corresponding to a respective category of the plurality of categories, individual category components being configured to, upon a first user interaction, provide additional information corresponding to a respective category of the plurality of categories, and a respective visual display of the individual category components being based at least in part on a navigation context;
   monitor one or more second interactions with at least one of the plurality of items on the user interface rendered by a client device;
   identify a plurality of predicted items in a respective category based at least in part on the navigation context;
   determine a level of completeness of the respective category based at least in part on a quantity of user-selected items from the plurality of predicted items; and
   modify the dynamic navigation interface based at least in part on the one or more second interactions, the level of completeness, and an updated navigation context.

2. The system of claim 1, wherein, when executed, the at least one application further causes the at least one computing device to at least generate the navigation context based at least in part on a plurality of context factors.

3. The system of claim 2, wherein the plurality of context factors include at least one of: a brand of an entity associated with an electronic commerce site, a client device location, an entity location, a user eligibility status, a current item category, a type of user interface, a user interaction history, an item availability, an occurrence of an event, a time, a date, or a seasonality.

4. The system of claim 3, wherein, when executed, the at least one application causes the at least one computing device to at least generate the updated navigation context based at least in part on the plurality of context factors and the one or more second interactions.

5. The system of claim 2, wherein the plurality of context factors comprise at least one static factor and at least one dynamic factor.

6. The system of claim 1, wherein modifying the dynamic navigation interface comprises at least one of: modifying the respective visual display of at least one of the plurality of category components or modifying an order of placement of the plurality of category components.

7. The system of claim 1, wherein the respective visual display includes at least one of: a numerical value indicating the level of completeness of the respective category based on the navigation context, a completeness, a status interface, an emphasizing highlight, or a deemphasizing highlight.

8. The system of claim 1, wherein the additional information includes a listing of a subset of the plurality of items and at least one selectable component configured to facilitate a selection of at least one item in the subset of the plurality of items.

9. A method, comprising:
   generating, by at least one computing device, a user interface comprising a dynamic navigation interface in a first region and a plurality of items in a second region, the plurality of items being associated with one or more of a plurality of categories;
   generating, by the at least one computing device, within the dynamic navigation interface, a plurality of category components, individual category components of the plurality of category components corresponding to a respective category of the plurality of categories, individual category components being configured to, upon a first user interaction, provide additional information corresponding to a respective category of the plurality of categories, and a respective visual display of the individual category components being based at least in part on a navigation context;
   monitoring, by the at least one computing device, one or more second interactions with at least one of the plurality of items on the user interface rendered by a client device;
   identifying, by the at least one computing device, a plurality of predicted items in a respective category based at least in part on the navigation context;
   determining, by the at least one computing device, a level of completeness of the respective category based at least in part on a quantity of user-selected items from the plurality of predicted items; and modifying, by the at least one computing device, the dynamic navigation interface based at least in part on the one or more second interactions, the level of completeness, and an updated navigation context.

10. The method of claim 9, further comprising generating the navigation context based at least in part on a plurality of context factors.

11. The method of claim 10, further comprising generating the updated navigation context based at least in part on the plurality of context factors and the one or more second interactions.

12. The method of claim 10, wherein the plurality of context factors comprise at least one static factor and at least one dynamic factor.

13. The method of claim 9, wherein modifying the dynamic navigation interface comprises at least one of: modifying the respective visual display of at least one of the plurality of category components or modifying an order of placement of the plurality of category components.

14. A non-transitory computer readable medium comprising machine-readable instructions that when executed by at least one computing device, cause the at least one computing device to at least:
generate a user interface comprising a dynamic navigation interface in a first region and a plurality of items in a second region, the plurality of items being associated with one or more of a plurality of categories;
generate, within the dynamic navigation interface, a plurality of category components, individual category components of the plurality of category components corresponding to a respective category of the plurality of categories, individual category components being configured to, upon a first user interaction, provide additional information corresponding to a respective category of the plurality of categories, and a respective visual display of the individual category components being based at least in part on a navigation context;
monitor one or more second interactions with at least one of the plurality of items on the user interface rendered by a client device;
identify a plurality of predicted items in a respective category based at least in part on the navigation context;
determine a level of completeness of the respective category based at least in part on a quantity of user-selected items from the plurality of predicted items; and
modify the dynamic navigation interface based at least in part on the one or more second interactions, the level of completeness, and an updated navigation context.

15. The non-transitory computer readable medium of claim 14, wherein, when executed, the machine-readable instructions further cause the at least one computing device to at least generate the navigation context based at least in part on a plurality of context factors.

16. The non-transitory computer readable medium of claim 15, wherein the plurality of context factors include at least one of: a brand of an entity associated with an electronic commerce site, a client device location, an entity location, a user eligibility status, a current item category, a type of user interface, a user interaction history, an item availability, an occurrence of an event, a time, a date, or a seasonality.

17. The non-transitory computer readable medium of claim 14, wherein the additional information includes a listing of a subset of the plurality of items and at least one selectable component configured to facilitate a selection of at least one item in the subset of the plurality of items.

18. The system of claim 1, wherein the plurality of categories are defined by an item catalog taxonomy, the plurality of category components being based at least in part on an offering of items included in the plurality of categories.

19. The method of claim 9, wherein the plurality of categories are defined by an item catalog taxonomy, the plurality of category components being based at least in part on an offering of items included in the plurality of categories.

20. The non-transitory computer readable medium of claim 14, wherein the plurality of categories are defined by an item catalog taxonomy, the plurality of category components being based at least in part on an offering of items included in the plurality of categories.

* * * * *